United States Patent
Chang et al.

(10) Patent No.: US 7,293,710 B2
(45) Date of Patent: Nov. 13, 2007

(54) METHOD OF OVERCURRENT PROTECTION FOR MULTI-SLOT FLASH MEMORY CARD READER

(75) Inventors: Chi-Tung Chang, Taipei County (TW); Hüng-Chou Tsai, Nantou County (TW); Kuan Chia Huang, Taipei County (TW)

(73) Assignee: Alcor Micro, Corp. (TW)

( * ) Notice: Subject to any disclaimer, the term of this patent is extended or adjusted under 35 U.S.C. 154(b) by 435 days.

(21) Appl. No.: 10/818,065

(22) Filed: Apr. 3, 2004

(65) Prior Publication Data

US 2005/0218228 A1   Oct. 6, 2005

(51) Int. Cl.
*G06K 7/08* (2006.01)
(52) U.S. Cl. .................. 235/451; 235/441; 235/476
(58) Field of Classification Search .............. 235/451, 235/453, 476, 474, 441; 361/58, 18, 54–57, 361/90, 91.1
See application file for complete search history.

(56) References Cited

U.S. PATENT DOCUMENTS

| | | | | |
|---|---|---|---|---|
| 5,572,395 A | * | 11/1996 | Rasums et al. ............... | 361/58 |
| 5,712,754 A | * | 1/1998 | Sides et al. ................... | 361/58 |
| 6,105,090 A | * | 8/2000 | Fosmo ....................... | 710/302 |
| 6,438,638 B1 | * | 8/2002 | Jones et al. ................. | 710/301 |
| 6,557,106 B1 | * | 4/2003 | Yuzawa et al. ............. | 713/300 |

* cited by examiner

Primary Examiner—Kimberly D. Nguyen

(57) ABSTRACT

A method of overcurrent protection for multi-slot flash memory card reader mainly includes integrating overcurrent protection circuit and power-supply circuit for the multiple slots of the card reader into one single control chip; and, when the overcurrent protection circuit detects an overcurrent at a particular slot, cutting off power supply to that particular slot of the card reader and enabling an overcurrent state register, so that a signal is provided to firmware in the control chip to display an icon of the card reader on a computer as a state indicating an abnormal condition. Whereby, the card reader and a flash memory card inserted therein, or other apparatus connected thereto would not be damaged when an overcurrent occurs, and a user may clearly know the exact point on the card reader where the overcurrent occurs.

3 Claims, 5 Drawing Sheets

METHOD OF OVERCURRENT PROTECTION FOR MULTI-SLOT FLASH MEMORY CARD READER

FIELD OF THE INVENTION

The present invention relates to a method of overcurrent protection for multi-slot flash memory card reader, and more particularly to a method of overcurrent protection for a card reader that protects the card reader or other apparatus connected thereto against damage when an overcurrent occurs, and enables a user to clearly know the exact point on the card reader where the overcurrent occurs.

BACKGROUND OF THE INVENTION

Portable apparatus using flash memory are more and more popular among general consumers. Various types of flash memory cards for use with these apparatus are also quickly developed and introduced into the market. Among others, CompactFlash Type I & II (CF), Microdrive (MD), SmartMedia (SM), Memory Stick (MS), MS Pro, MS Duo, MultiMedia Card (MMC), Secure Digital (SD), and the recent xD Picture Card (xD) are the currently most popular types of flash memory cards.

Before the flash memory card reader has been developed, most apparatus, such as digital cameras, are directly connected to a computer via a serial port or a universal serial bus (USB) line. This type of connection is all right for small files. However, with the introduction of more complete apparatus and high-capacity flash memory cards, the size of data files increases in multiplication. Although there are still apparatus directly connected to the computer via the serial port or the USB line, these apparatus have been improved to enable convenient ejection of a flash memory card therefrom for inserting in a flash memory card reader. Moreover, to match various currently available flash memory cards, dual-slot or even multi-slot card readers have been developed. It is apparent the card reader is an electronic product getting more and more popular among consumers.

However, all electronic products have the problem of overcurrent (that is, short circuit). When a short-circuited and damaged flash memory card is inserted in a slot on the card reader, or there is defect in the produced card reader, or a user carelessly admits electrically conductive material, such as water or coin, into the card slot to result in short circuit of the card reader, not only the card reader and the flash memory card, but also the connected computer would be seriously damaged. Nevertheless, most card readers currently available in the market are not provided with means for complete overcurrent protection.

FIG. 3 is a block diagram showing the connection of a conventional memory card reader 3 with a USB interface 4; FIG. 4 is a schematic diagram showing a short-circuit-detecting protection circuit 6 for the conventional memory card reader 3; and FIG. 5 is a schematic perspective view of the conventional memory card reader 3.

As shown, the conventional memory card reader 3 is internally provided with a single chip 31, which is electrically connected to the USB interface 4. With the USB standard interface, the memory card reader has the ability of hot attach & detach. The single chip 31 is also electrically connected to a card reading unit 32, which reads/writes data from/into a memory card 5 inserted in a card slot 30 on the card reader 3.

More specifically, to enable the use of single chip and USB standard interface, the conventional memory card reader 3 achieves the ability of hot attach & detach by including a USB interface unit 4 that is electrically connected to a single chip 31 to perform data transmission and thereby provides data to the memory card reader 3.

When a user inserts a memory card 5 in a card slot 30 on the card reader 3, data are read from or written into the memory card 5 via a card reading unit 32.

The single chip 31 is electrically connected to the USB interface unit 4, so that the memory card reader 3 achieves the ability of hot attach & detach via the USB standard interface. Since the single chip 31 has bi-directional input/output function, sequential transmission and detection of the memory card 5 is not a problem. Moreover, in practical applications, the same function may be equally achieved using software instead of hardware, such as a finite-state machine (FSM). When a clock circuit is integrated into the single chip 31, it is not necessary to buy an additional IC at extra expense.

The conventional memory card reader 3 is provided with a software detection and protection circuit 6 that includes an external transistor 33 for controlling power supply to the card, and uses software to detect any voltage drop in the memory card 5. When a short circuit in the memory card 5 results in a voltage drop, the single chip 31 would turn off the transistor 33. Meanwhile, for the purpose of preventing impact by high amount of instantaneous current, a resistance capacitance delay unit 34 is interposed at an intermediate feedback path to moderate voltage rise and voltage drop.

In the case of a conventional one-slot card reader, it is automatically powered off when an overcurrent (that is, a short circuit) occurs at the card slot. That is, the whole card reader is off. In the case of a conventional multi-slot card reader, the whole card reader is automatically powered off when any one of the multiple slots is overcurrent (short-circuited). At this point, other normal card slots on the card reader are disabled at the same time. The user could not clearly know the exact card slot that is overcurrent, forming confusions in using the card reader.

It is therefore tried by the inventor to develop a method of overcurrent protection for multi-slot flash memory card reader, so that the card reader or other apparatus connected thereto is protected against damage when an overcurrent occurs, and a user is enabled to clearly know the exact point on the card reader where the overcurrent occurs.

SUMMARY OF THE INVENTION

A primary object of the present invention is to provide a method of overcurrent protection for a multi-slot flash memory card reader, so that the card reader or other apparatus connected thereto is protected against damage when an overcurrent occurs, and a user is enabled to clearly know the exact point on the card reader where the overcurrent occurs.

To achieve the above and other objects, the method of the present invention includes the following steps:

(A) Integrate overcurrent protection circuit and power-supply circuit for the multiple slots of the card reader into one single control chip; and (B) Cut off power supply to a particular slot of the card reader when the overcurrent protection circuit detects an overcurrent at that particular slot.

Thereby, the card reader or other apparatus connected thereto is protected against damage when an overcurrent occurs, and other normal card slots of the card reader remain workable.

The method of the present invention may further include the following steps: providing in the control chip an overcurrent state register for the overcurrent protection circuit; detecting the state of the overcurrent state register using firmware in the control chip; sending the detected state of the overcurrent state register to a computer by the control chip via an instruction; using particular software in the computer to conduct periodic polling to get instructions from the control chip about the detected state; enabling the overcurrent state register when an overcurrent state in any card slot of the card reader is detected by the overcurrent protection circuit; and sending an instruction about the detected overcurrent state to the computer via the control chip, so that software in the computer changes a displaying state of an icon of the card reader on the computer to inform a user about such overcurrent, so that the user may remove the flash memory card from the card reader, and clearly know the exact point on the card reader where the overcurrent occurs.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
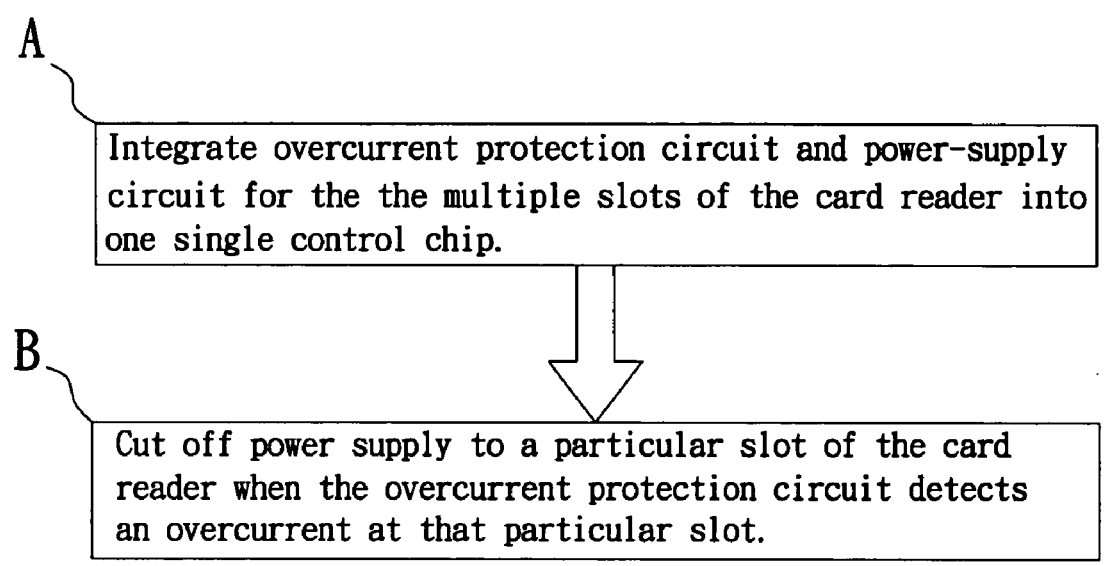
FIG. 1 is a flowchart showing steps included in the method of overcurrent protection for multi-slot flash memory card reader according to the present invention.

Please refer to FIG. 1 that is a flowchart showing steps included in the method of overcurrent protection for multi-slot flash memory card reader according to the present invention. As shown, the method of the present invention includes the following steps:

(A) Integrate overcurrent protection circuit and power-supply circuit for the multiple slots of the card reader into one single control chip; and (B) Cut off power supply to a particular slot of the card reader when the overcurrent protection circuit detects an overcurrent at that particular slot.

Figure 2:
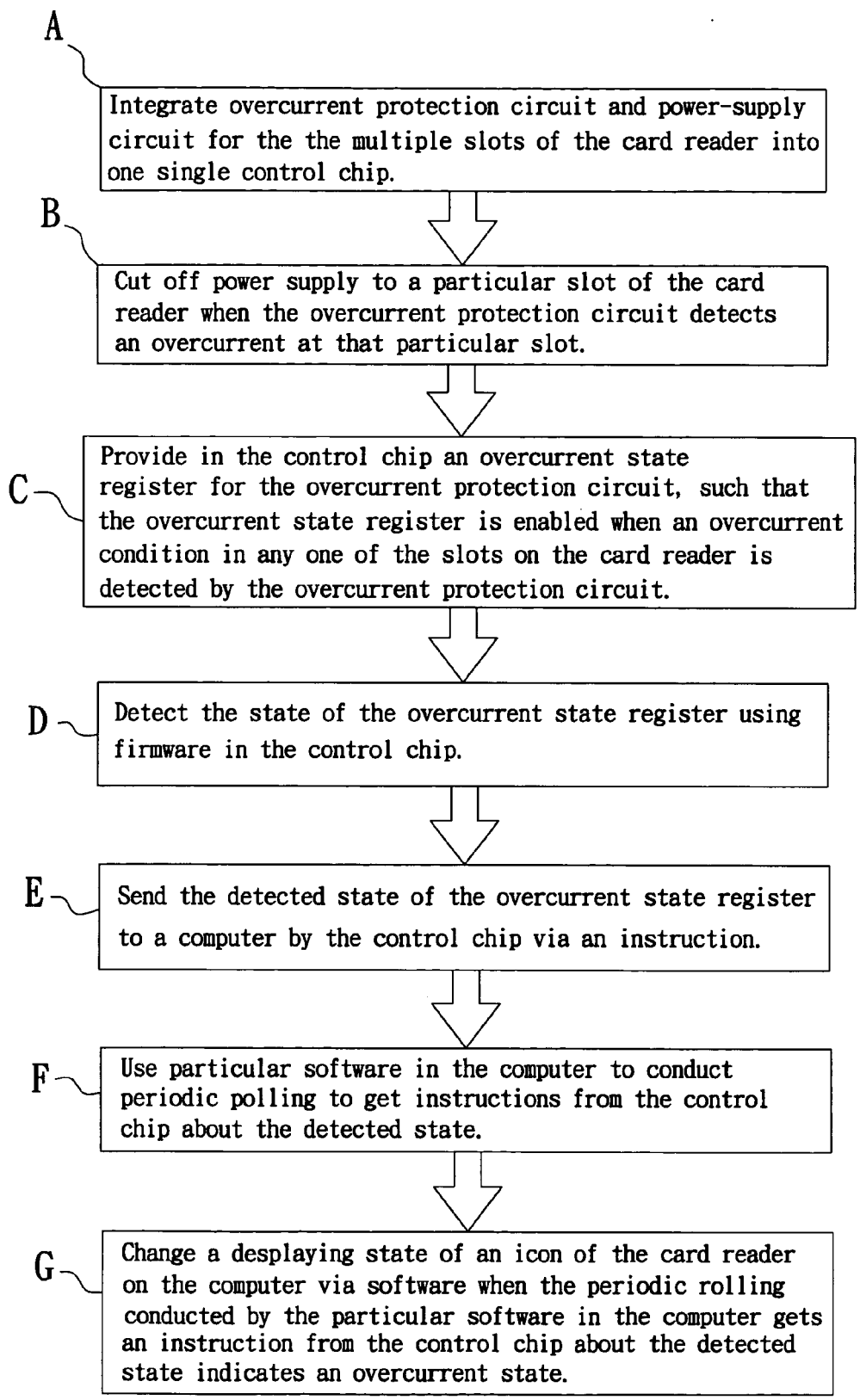
FIG. 2 is another flowchart showing steps included in the method of overcurrent protection for multi-slot flash memory card reader according to the present invention.
Figure 3:
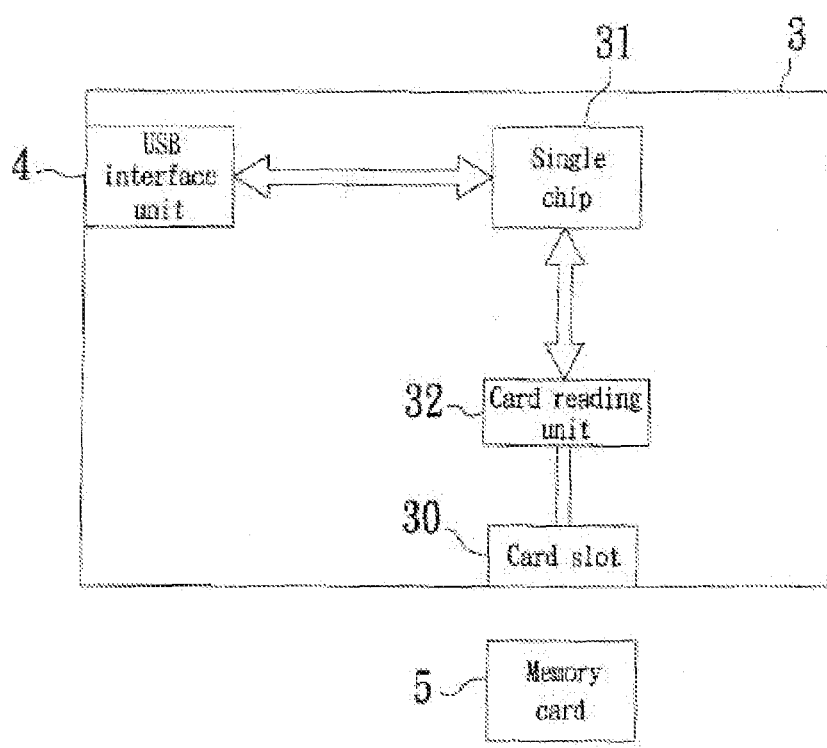
FIG. 3 is a block diagram showing the connection of a conventional memory card reader with a USB interface.
Figure 4:
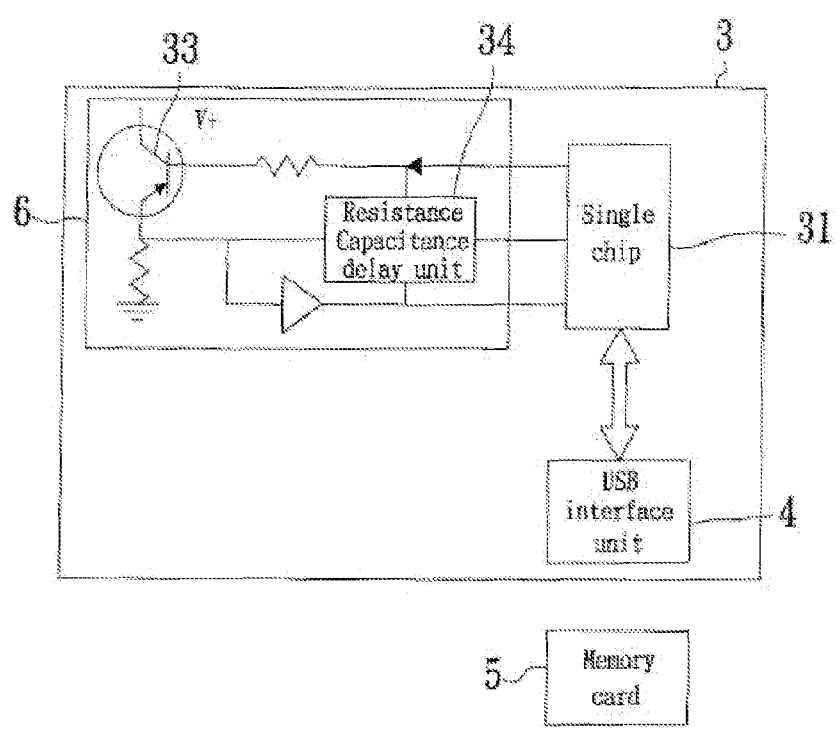
FIG. 4 is a schematic diagram showing a short-circuit-detecting protection circuit for the conventional memory card reader.
Figure 5:
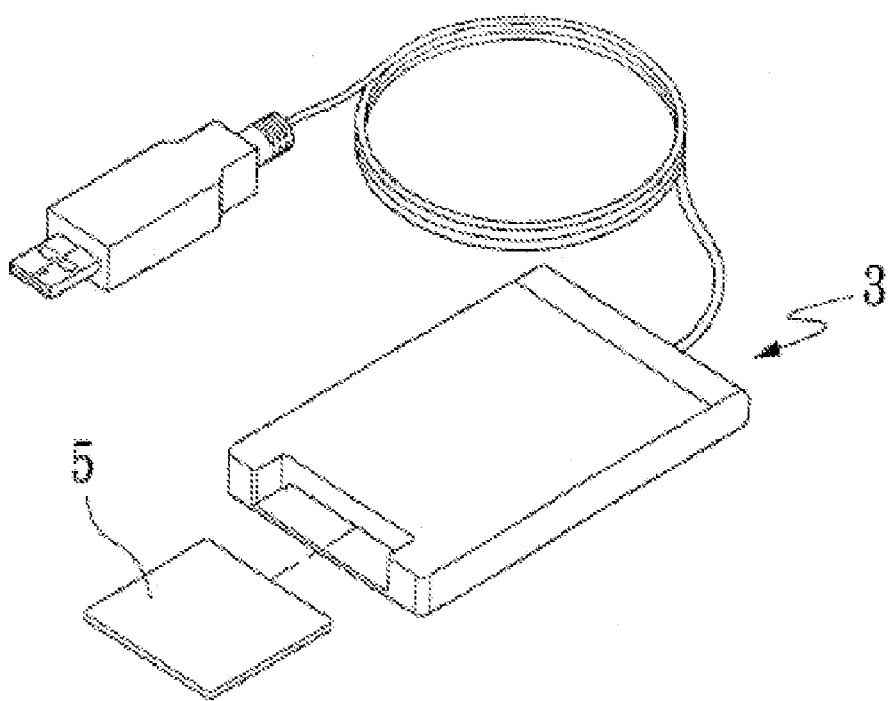
FIG. 5 is a schematic perspective view of a conventional memory card reader.

Please refer to FIG. 2 that is another flowchart showing steps included in the method of overcurrent protection for multi-slot flash memory card reader according to the present invention. As shown, the method of the present invention includes the following steps:

(A) Integrate overcurrent protection circuit and power-supply circuit for the multiple slots of the card reader into one single control chip;

(B) Cut off power supply to a particular slot of the card reader when the overcurrent protection circuit detects an overcurrent at that particular slot;

(C) Provide in the control chip an overcurrent state register for the overcurrent protection circuit, such that the overcurrent state register is enabled when an overcurrent condition in any one of the slots on the card reader is detected by the overcurrent protection circuit;

(D) Detect the state of the overcurrent state register using firmware in the control chip;

(E) Send the detected state of the overcurrent state register to a computer by the control chip via an instruction;

(F) Use particular software in the computer to conduct periodic polling to get instructions from the control chip about the detected state; and (G) Change a displaying state of an icon of the card reader on the computer via software when the periodic rolling conducted by the particular software in the computer gets an instruction from the control chip about the detected state indicates an overcurrent state.

Wherein the card reader may be a one-slot, a dual-slot, or a multi-slot card reader. And, the displaying state of the icon of the card reader on the computer may be, for example, a burning flame.

In the above step (D), the firmware in the control chip will constantly detect the state of the overcurrent state register, and the detected state is sent to the computer via an instruction as in step (E). And, in step (F), particular software in the computer conducts periodic polling to get instructions from the control chip about the detected state, so that any occurrence of overcurrent state will be immediately detected and a user is informed about the detected overcurrent condition of the card reader in step (G).

With the above steps, the method of overcurrent protection for multi-slot flash memory card reader according to the present invention has the following advantages:

1. The card reader or other apparatus connected thereto would not be damaged when the overcurrent occurs.

In step (B), when an overcurrent state in any of the slots of the card reader is detected by the overcurrent protection circuit, power supply to that slot with overcurrent is cut off, so that the card reader or other apparatus connected thereto would not be damaged at the time the overcurrent occurs.

2. The card reader may have further reduced volume.

In step (A), the overcurrent protection circuit and the power supply circuit for all the card slots are integrated into one single control chip of the card reader, so that the card reader may be effectively reduced in volume.

3. A user may clearly know the exact point on the card reader at where the overcurrent occurs.

With steps (C), (D), (E), (F), and (G), the computer software will automatically change the displaying state of the card reader icon when an overcurrent occurs, so that the user's attention is drawn to the fact that an overcurrent occurs in the card reader. In the case the card reader is a multi-slot card reader, it is also possible for the computer software to display an icon of the card reader corresponding to a card slot having the overcurrent state as a burning flame or other sign indicating an abnormal state, so that the user clearly knows which card slot of the card reader is overcurrent.

What is claimed is:

1. A method of overcurrent protection for multi-slot flash memory card reader, comprising the following steps:

(A) Integrate overcurrent protection circuit and power-supply circuit for the multiple slots of the card reader into one single control chip;

(B) Cut off power supply to a particular slot of the card reader when the overcurrent protection circuit detects an overcurrent at that particular slot;

(C) Provide in the control chip an overcurrent state register for the overcurrent protection circuit, such that the overcurrent state register is enabled when an overcurrent condition in any one of the slots on the card reader is detected by the overcurrent protection circuit;

(D) Detect the state of the overcurrent state register using firmware in the control chip;

(E) Send the detected state of the overcurrent state register to a computer by the control chip via an instruction;

(F) Use particular software in the computer to conduct periodic polling to get instructions from the control chip about the detected state; and (G) Change a displaying state of an icon of the card reader on the computer via software when the periodic rolling conducted by the particular software in the computer gets an instruction from the control chip about the detected state indicates an overcurrent state.

2. The method of overcurrent protection for multi-slot flash memory card reader as claimed in claim 1, wherein the card reader is selected from the group consisting of one-slot card reader, dual-slot card reader, and multi-slot card reader.

3. The method of overcurrent protection for multi-slot flash memory card reader claimed in claim 1, wherein the displaying state of the icon of the card reader on the computer is a burning flame.

* * * * *